United States Patent [19]

Miyazaki et al.

[11] Patent Number: 4,830,163
[45] Date of Patent: May 16, 1989

[54] CENTRIFUGAL CLUTCH

[75] Inventors: Kunio Miyazaki, Saitama; Kunihiko Azuma; Satoru Noguchi, both of Shizuoka, all of Japan

[73] Assignee: Honda Giken Kogyo Kabushiki Kaisha, Tokyo, Japan

[21] Appl. No.: 76,089

[22] Filed: Jul. 21, 1987

[30] Foreign Application Priority Data

Jul. 22, 1986 [JP] Japan .................. 61-172324

[51] Int. Cl.$^4$ .............................................. F16D 43/18
[52] U.S. Cl. ................... 192/105 CD; 192/52; 192/75
[58] Field of Search ............. 192/48.1, 48.7, 52, 192/75, 105 CD

[56] References Cited

U.S. PATENT DOCUMENTS

| 2,361,898 | 10/1944 | Ferguson et al. ............ | 192/75 |
| 4,345,664 | 8/1982 | Anno et al. ............... | 192/105 CD |
| 4,378,219 | 3/1983 | Takana ................... | 192/48.7 |

FOREIGN PATENT DOCUMENTS

| 1155356 | 10/1963 | Fed. Rep. of Germany ...... | 192/105 CD |
| 1201185 | 9/1965 | Fed. Rep. of Germany ...... | 192/105 CD |
| 49-43647 | 4/1974 | Japan . | |
| 830571 | 3/1960 | United Kingdom ........ | 192/105 CD |

Primary Examiner—Rodney H. Bonck
Assistant Examiner—David A. Testardi
Attorney, Agent, or Firm—Lyon & Lyon

[57] ABSTRACT

A centrifugal clutch comprises a driving plate having oppositely facing surfaces secured to an input shaft operatively connected to a driving source, a cylindrical bottomed drum detachably secured to an end, projecting from the input shaft, of an output shaft concentrically and relatively rotatably disposed within the input shaft, the cylindrical bottomed drum surrounding the driving plate, and a plurality of clutch springs each connected to each of a plurality of shoes which are supported on the plate for movement toward and away from an inner peripheral surface of the drum respectively by a plurality of stub shafts parallel to the input shaft, the clutch spring providing a spring force in a direction away from the inner peripheral surface of the drum. In the centrifugal clutch, a group of the shoes and clutch springs having respective weight and load which are set to transmit a relatively large torque between the input shaft and the output shaft are arranged closer to the closed end of the drum, and another group of shoes and clutch springs having respective weight and load set so as to transmit a relatively small torque between the input shaft and the output shaft are arranged closer to an opened end of the drum.

25 Claims, 7 Drawing Sheets

CENTRIFUGAL CLUTCH

BACKGROUND OF THE INVENTION

1. Field of the Invention

The present invention relates to a centrifugal clutch comprising a driving plate secured to an input shaft operatively connected to a driving source, a cylindrical bottomed drum detachably secured to an end, projecting from the input shaft, of an output shaft concentrically and relatively rotatably disposed within the input shaft, the cylindrical bottomed drum surrounding the driving plate, and a clutch spring connected to each of a plurality of shoes supported on the drum for movement toward and away from an inner peripheral surface of the drum respectively by a plurality of stub shafts parallel to the input shaft, the clutch spring providing a spring force in a direction away from the inner peripheral surface of the drum.

2. Description of the Prior Art

In such centrifugal clutch, it is conventionally common to arrange shoes and clutch springs on one side of the driving plate (for example, see Japanese Utility Model Application Laid-open No. 43647/74).

Such centrifugal clutch is usually utilized in motorcycles of a smaller stroke volume or the like in combination with a V-belt type continuously variable transmission, but an attempt has been made to apply this type of clutch to a vehicle of larger stroke volume because of an ease of operation thereof. In this case, it is necessary to increase the clutch capacity of the centrifugal clutch.

To increase the clutch capacity, it is considered to increase the weight of a shoe; to increase the number of shoes; or to increase its entire effective diameter.

However, if the weight of a shoe is increased, it is required to enhance the rigidity of the driving plate and the drum so that they can meet an increase in centrifugal force corresponding to such increase in weight of the shoe, and consequently, the entire weight must also increase. Moreover, it is also necessary to increase the spring load of the clutch spring following the increase in shoe weight, and this causes a difficulty in setting the spring load.

To increase the number of shoes for meeting the requirement, there is a limitation in space for the number of shoes mountable on the driving plate and hence, increasing the number of shoes is impossible in many cases.

Further, there are also a lot of limitations in space for increasing the entire effective diameter and it is impossible in many cases.

SUMMARY OF THE INVENTION

The present invention has been accomplished with the above circumstances in view, and it is an object of the present invention to provide a centrifugal clutch which has a structure remaining of small size and light weight but whose clutch capacity is increased and maintenance is facilitated.

According to the present invention, the above object is achieved by providing a centrifugal clutch comprising a driving plate secured to an input shaft operatively connected to a driving source, a cylindrical bottomed drum detachably secured to an end projecting from the input shaft, an output shaft concentrically and relatively rotatably disposed within the input shaft, the cylindrical bottomed drum surrounding the driving plate, and a plurality of clutch springs each connected to each of a plurality of shoes supported on the plate for movement toward and away from an inner peripheral surface of the drum respectively by a plurality of stub shafts parallel to the input shaft, the clutch spring providing a spring force in a direction away from the inner peripheral surface of the drum, wherein a group of said shoes having a weight and said clutch springs having a load which are set so as to transmit a relatively large torque between the input shaft and the output shaft are arranged closer to a closed end of the drum, and another group of said shoes having a weight and said clutch springs having a load which are set so as to transmit a relatively small torque between the input shaft and the output shaft are arranged closer to an opened end of the drum.

With the above construction, the shoes and clutch springs are arranged on the opposite sides of the driving plate and therefore, it is possible to increase the number of the clutch shoes while avoiding increase in the entire effective diameter, thereby providing an increase in clutch capacity. Furthermore, it is possible to avoid an increase in weight of each shoe, and difficulty can be avoided in setting the spring load of the clutch spring. In addition, since the shoes and clutch springs for permitting a relatively large torque to be transmitted are located in the vicinity of the closed end of the drum, a maintenance operation such as replacement of a worn shoe, can be easily carried out when the drum has been removed from the output shaft.

BRIEF DESCRIPTION OF THE DRAWINGS

FIGS. 1-5 show an embodiment according to the invention, wherein

DESCRIPTION OF THE PREFERRED EMBODIMENTS

Figure 1:
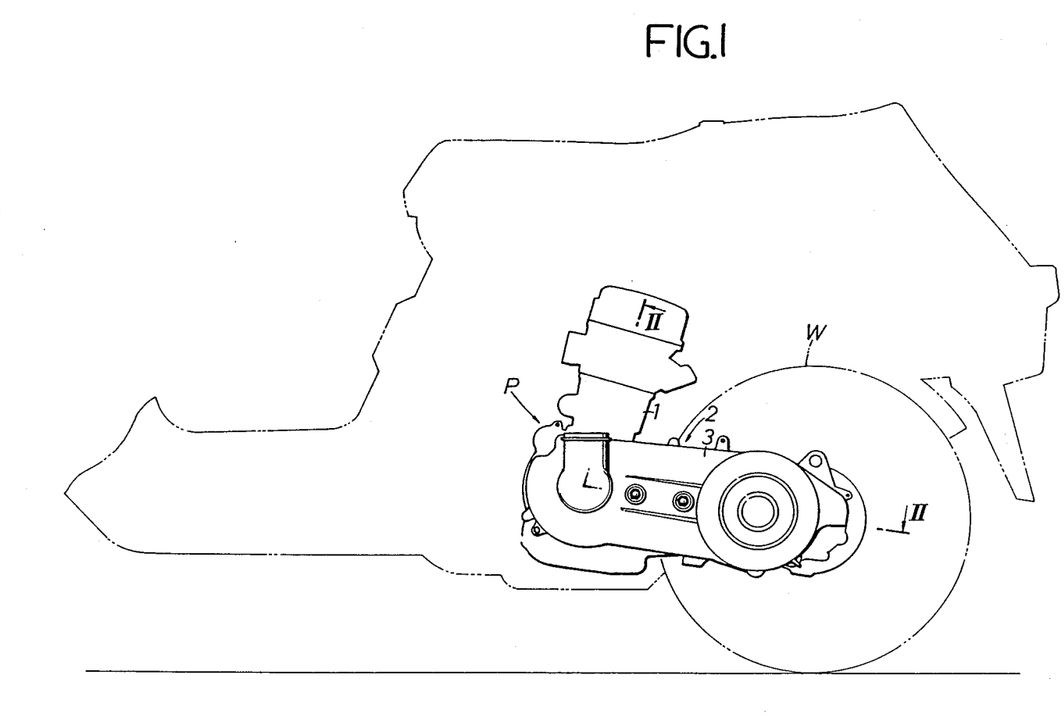
FIG. 1 is a side view of a power unit mounted on a motorcycle.
Figure 2:
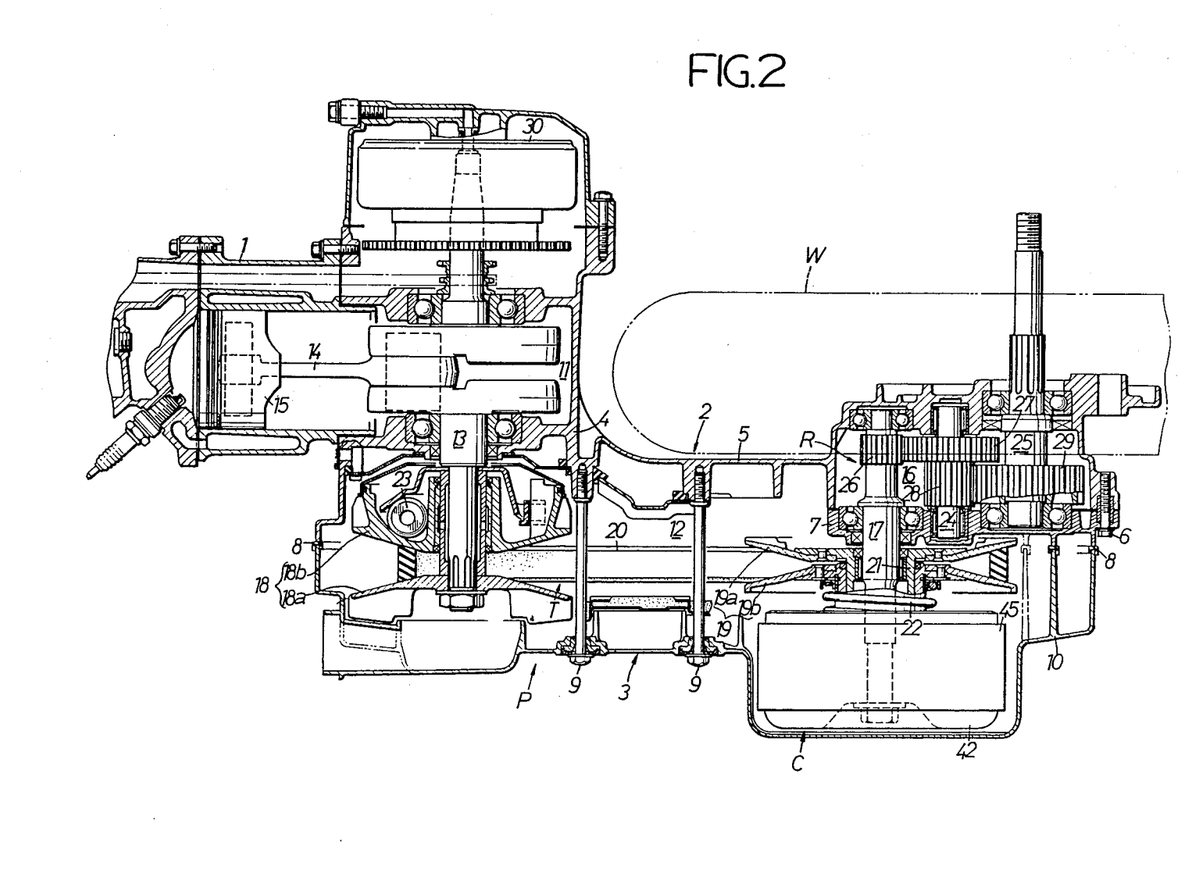
FIG. 2 an enlarged sectional view taken along the line II—II of FIG. 1.

The present invention will now be described by way of embodiments with reference to the accompanying drawings. Referring first to FIGS. 1 and 2 illustrating one embodiment of the present invention, a power unit P is suspended on a vehicle body of a motorcycle such as a motor scooter. The power unit P comprises an engine body 1, a transmission gear 2 mounted on one side of the engine body 1 adjacent to its lower portion, and a rear wheel W carried at the rear portion of the transmission gear 2.

The transmission gear has a casing 3 which comprises a wall 5 integrally connected to a crank case 4 of the engine body 1 to extend rearwardly, a transmission cover 7 secured to the rear portion of the wall 5 by a connecting bolt 6, and a cover case 10 secured to the wall 5 by connecting bolts 9 with an elastic seal member 8 interposed between the wall 5 and the transmission cover 7.

A transmission chamber 12 is defined within the casing 3 adjacent to a crank chamber 11 defined within the crank case 4. A crank shaft 13 is rotatably journaled on the crank case 4, and a piston 15 is connected to the crank shaft 13 within the crank chamber 11 through a connecting rod 14. A gear chamber 16 is also defined within the casing 3 at its rear portion between the wall 5 and the transmission cover 7, and an output shaft 17 parallel to the crank shaft 13 is rotatably provided transversely within the gear chamber 16.

The crank shaft 13 and the output shaft 17 project into the transmission chamber 12 within which a V-belt type continuously variable transmission T and a centrifugal clutch C are housed between the crank shaft 13 and the output shaft 17.

The continuously variable transmission T comprises a driving pulley 18 disposed on the side of the crank shaft 13, a driven pulley 19 disposed on the side of the output shaft 17, and an endless V-belt 20 wound around both the pulleys 18 and 19.

The driving pulley 18 comprises a stationary pulley half 18a secured to the crank shaft 13 and a movable pulley half 18b carried on the crank shaft 13 for axial sliding movement. The movable pulley half 18b is provided with a shifting weight roller 23 which permits the movable pulley half 18b to move toward the stationary pulley half 18a upon a centrifugal force acting on the roller.

The driven pulley 19 comprises a stationary pulley half 19a secured to a cylindrical pulley shaft which is relatively rotatably disposed around the output shaft 17 in the form of an input shaft 21 for the centrifugal clutch C, and a movable pulley half 19b supported for sliding movement on the input shaft 21. The movable pulley half 19b is biased toward the stationary pulley half 19a by a spring 22 interposed between the movable pulley half 19b and the centrifugal clutch C.

With such continuously variable transmission T, as the number of rotation of the crank shaft 13 increases, the V-belt 20 is drawn toward the driving pulley 18 due to an increase in effective diameter of the driving pulley 18. The driven pulley 19 is correspondingly reduced in effective diameter, so that the shifting ratio between the crank shaft 13 and the input shaft 21 can be automatically and continuously reduced.

A reduction gear mechanism R is contained in the gear chamber 16. The reduction gear mechanism R comprises the output shaft 17, a reduction shaft 24 rotatably carried on the wall 5 and the transmission cover 7 in parallel with the output shaft 17, an axle 25 rotatably carried on the wall 5 and the transmission cover 7 in parallel with the reduction shaft 24, with a portion of the axle 25 being protruded outside the gear chamber 16, a driving gear 26 integral with the output shaft 17, a first reduction gear 27 integral with the reduction shaft 24 and meshed with the driving gear 26, a second reduction gear 28 integral with the reduction shaft 24, and a third reduction gear 29 integral with the axle 25 and meshed with the second reduction gear 28.

The rear wheel W is fitted over the axle 25 protruded out of the gear chamber 16. In addition, an AC generator 30 is connected to an end of the crank shaft 13 opposite to the continuously variable transmission T.

Figure 3:
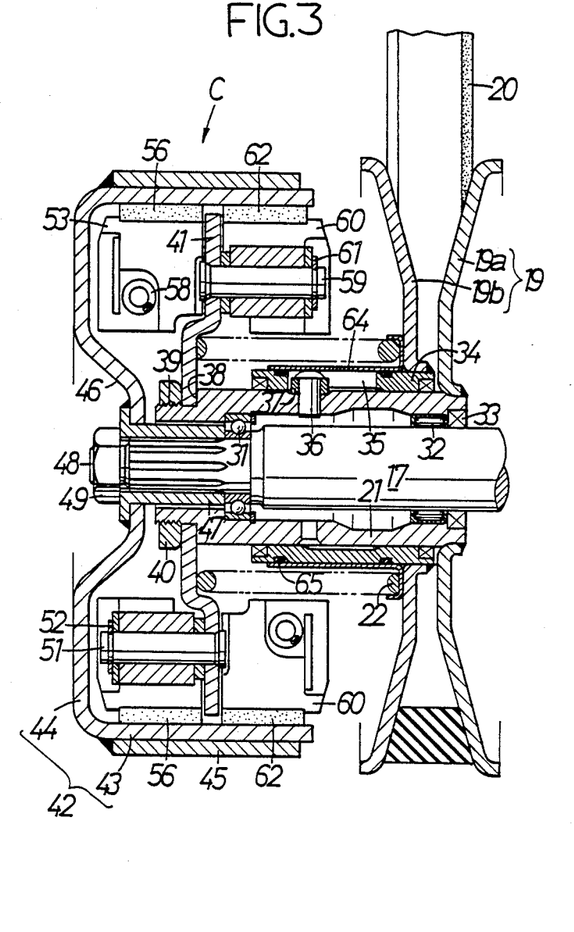
FIG. 3 is an enlarged elevational view of a centrifugal clutch.

Referring to FIG. 3, the centrifugal clutch C is constructed according to the present invention and operates to couple the input shaft 21 and the output shaft 17 when the number of rotations of the input shaft 21 increases to a level more than a predetermined value.

The input shaft 21 is disposed to concentrically surround the output shaft 17, with bearings 31 and 32 and a sealing member 33 being interposed between the both shafts 21 and 17. It follows that the input shaft 21 is relatively rotatably carried over the output shaft 17.

A cylindrical, sliding sleeve 34 is slidably fitted over the input shaft 21 and integrally formed with the movable pulley half 19b of the driven pulley 19, and an axially extending elongated hole 35 is made in the sliding sleeve 34. A guide roller 37 in sliding contact with an inner surface of the elongated hole 35 is pivoted on a pin 36 embedded in the input shaft 21 perpendicularly to an axis of the latter, so that the sliding sleeve 34 is slidably fitted over the input shaft 21 so as to prevent rotation of the sleeve relative to the input shaft 21 but permit movement only in the axial direction. A cylindrical receptacle member 64 is fitted over the sliding sleeve 34 to abut against the movable pulley half 19b, with sealing members 65 interposed therebetween on the opposite sides of the elongated hole 35 along an axis of the cylindrical receptacle member 64.

The input shaft 21 is provided at the other end thereof with an external threaded portion 39 of a reduced diameter through a stepped portion 38 faced outwardly, and a basically disk-like driving plate 41 is secured to the input shaft 21 in such a manner that it is clamped between the stepped portion 38 and a nut 40 threadedly meshed with the external threaded portion 39. A spring 22 is interposed between the driving plate 41 and the receptacle member 64, i.e., the movable pulley half 19b of the driven pulley 19 for resiliently biasing the movable pulley half 19b toward the stationary pulley half 19a.

The output shaft 17 projects from the aforesaid other end of the input shaft 21, and a drum 42 is concentrically secured to the projecting end of the output shaft 17. The drum 42 is shaped in the form of a basically bottomed cylinder having a cylindrical portion 43 concentrically surrounding the driving plate 41 and an end plate portion 44 closing one end of the cylindrical portion 43, the end plate portion 44 being at its center secured to the output shaft 17. In addition, a reinforcing cylinder 45 is fitted over and secured to an outer periphery of the cylindrical portion 43.

The central portion of the end plate portion 44 is inwardly recessed to define a depression 46, and to the center of the depression 46 is secured a connecting tube 47 which can be spline-connected to the output shaft 17. Moreover, an external threaded portion 48 projecting out of the connecting tube 47 is coaxially mounted on the output shaft 17 in such a manner that the connecting tube 47 is spline-connected to the output shaft 17 to abut against an inner ring of the bearing 31. By tightening a nut 49 threadedly meshed with the external threaded portion 48 the drum 42 is fixedly secured to the output shaft 17.

By securing the drum 42 to the output shaft 17 in this manner, it is facilitated to remove the drum 42 from the output shaft 17 at maintenance. The provision of the depression 46 in the drum 42 makes is possible to reduce the length of the output shaft 17, and this contributes to an increase in rigidity of the output shaft 17.

Figure 4:
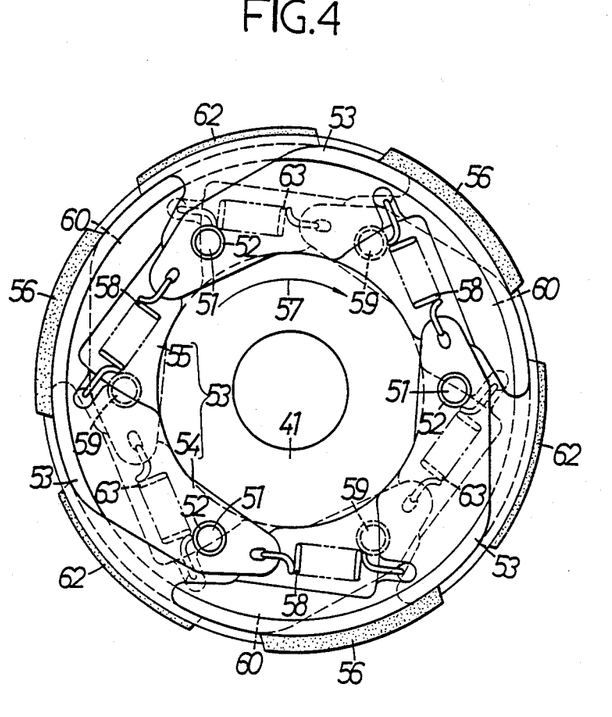
FIG. 4 is a front view showing a state in which shoes are mounted driving plate.

Referring also to FIG. 4, a plurality of, e.g., three first stub shafts 51 extend parallel to the input shaft 21 and the output shaft 17 and are implanted at circumferentially spaced distances in one side surface of the driving plate 41 in the vicinity of the closed end of the drum 42, i.e., the end plate portion 44. A first shoe 53 is swingably supported on each of the first stub shafts 51 in such a manner that it is prevented from being slipped out by a snap ring 52.

Each of the first shoes 53 comprises a support arm 54 supported at its middle portion by the first stub shaft 51 and a circular arc-shaped portion 55 curved into a circular arc to conform to an inner peripheral surface of the drum 42, the support arm 54 and the circular arc-shaped portion 55 being integrally formed together. A first lining material 56 capable of coming into slidable contact with the inner peripheral surface of the drum is affixed on an outer side surface of the circular arc-shaped portion 55. Furthermore, each first shoe 53 is arranged in a so-called leading fashion and the first lining material 56 is located at the front of the stub shaft 51 in a direction 57 of rotation of the input shaft 21 and the output shaft 17.

A first clutch spring 58 is interposed between the adjacent first shoes 53 for biasing the first lining material 56 for swinging movement away from the drum 42. More specifically, the first clutch spring 58 is connected at one end to a base end of one of the first shoes 53 and at the other end to the middle portion of the circular arc-shaped portion 54 of the other first shoe 53 adjacent to the aforesaid one first shoe 53.

Three second stub shafts 59 parallel to the input shaft 21 and the output shaft 17 are implanted at circumferentially spaced distances in the other side surface of the driving plate 41 closer to the opened end of the drum 42. Furthermore, each of the second stub shafts 59 is implanted in the driving plate 41 to lie centrally between the adjacent two of the above-described first stub shafts 51.

A second shoe 60 having a shape basically identical with that of the first shoe 53 is swingably supported at its base end on the second stub shaft 59 in such a manner that it is prevented from being slipped out by a snap ring 61, and a second lining material 62 capable of slidably contacting against the inner peripheral surface of the drum 42 is affixed on each of the second shoes 60. In addition, a second spring 63 is interposed between the adjacent second shoes 60. Moreover, like the first shoes 53 the second shoes 60 are arranged in a leading fashion and each second lining material 62 is located at the front of the second stub shaft 59 in the rotational direction 57.

More specifically, the first shoes 53 and the first clutch springs 58 are arranged on one side of the driving plate 41, while the second shoes 60 and the second clutch springs 63 are arranged on the other side of the driving plate 41.

Figure 5:
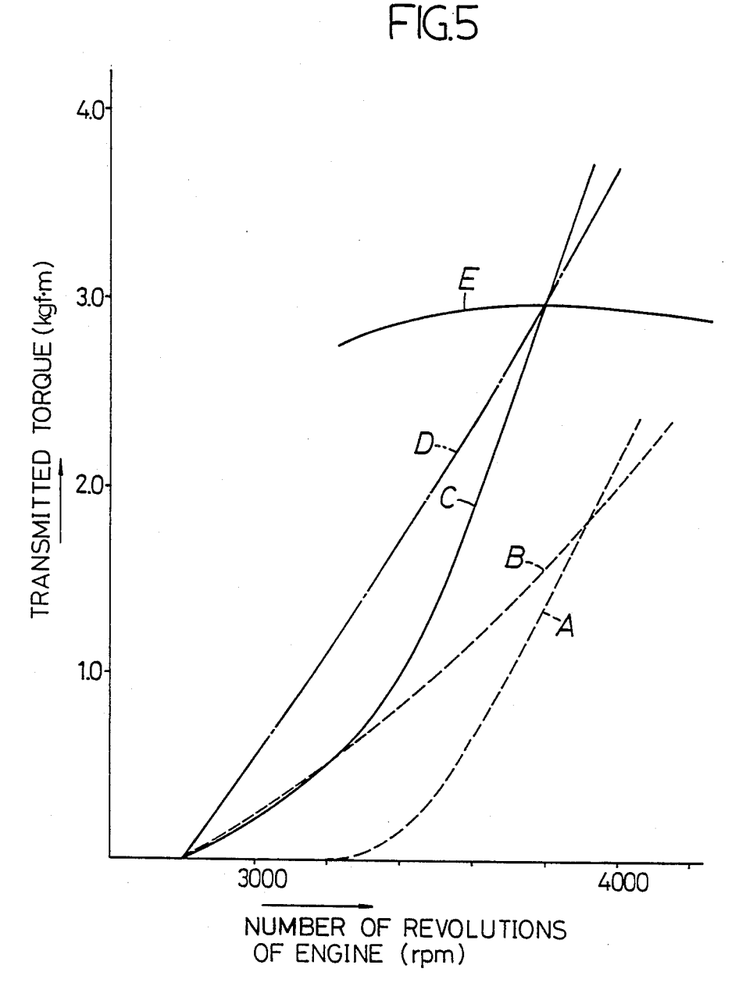
FIG. 5 shows the characteristics of torque of the centrifugal clutch.

Here, torque characteristic on the one side of the driving plate 41 is set as indicated by a curved line A in FIG. 5, while torque characteristic on the other side is set as indicated by a curved line B in FIG. 5. More particularly, a torque transmitted between the first shoe 53 and the drum 42 is set such that when the number of revolutions of an engine is relatively low, said torque is zero, but as the number of revolutions of the engine is increased, said torque is rapidly increased and thus, a relatively large torque is transmitted. On the other hand, a transmitted torque between the second shoe 60 and the drum 42 is set such that it is slowly increased from the instant when the number of revolutions of the engine is relatively small in response to an increase in number of revolutions of the engine and thus, a relatively small torque is transmitted.

As a result, an entire characteristic is as indicated by a curved line C, and as compared to that indicated by a curved line D of the prior art, the transmitted torque can be slowly increased when the number of revolutions of the engine is in a relatively low range. It is noted that a curved line E indicates an engine torque.

This setting of torque characteristics is accomplished either by setting respective loads of the first and second clutch springs 58 and 63 at different levels with weights of the first and second shoes 53 and 60 being the same, or by setting both of respective weights of the first and second shoes 53 and 60 and respective loads of the first and second clutch springs 58 and 63 at different levels.

Description will now be made of the operation of this embodiment. When the engine is started, power is transmitted from the crank shaft 13 via the continuously variable transmission T to the input shaft 21. When the number of revolutions of the engine has been increased to a level exceeding a given value, the centrifugal clutch C assumes an engaged state, so that the power is transmitted from the input shaft 21 to the output shaft 17. The rotative power of the output shaft 17 is transmitted through the reduction gear mechanism R to the rear wheel W.

Then, a transmitted torque characteristic of the centrifugal clutch C is as indicated by the curved line C in FIG. 5, such that a transmitted torque at the starting of engagement will be slowly increased. Accordingly, it is possible to avoid rapid application of a load to the engine, leading to an improved riding comfort.

Transmitting of a torque between the driving plate 41, i.e., the input shaft 21 and the drum 42, i.e., the output shaft 17 is effected by the plurality of first shoes 53 and the plurality of second shoes 60 and hence, the number of shoes can be increased to provide an increase in clutch capacity. Furthermore, since the first shoes 53 and the second shoes 60 are arranged on the opposite sides of the driving plate 41, it is unnecessary to increase the effective diameter of the centrifugal clutch C and this can contribute to a reduction in size of the centrifugal clutch C.

By arranging the pluralities of the first and second shoes 53 and 60 on the opposite sides of the driving plate 41, the weight of each of the shoes 53 and 60 can be relatively decreased, and therefore, a set load of each of the clutch springs 58, 60 can be relatively small. Furthermore, the directions of forces exerted on the driving plate 41 by the first and second shoes 53 and 60 are opposite to each other and thus, it is also unnecessary to give a reinforcement to the driving plate 41 by a rib or the like for enhancing the rigidity.

Further, since the first shoes 53 are supported by the first stub shafts 51 and the second shoes 60 are supported by the second stub shafts 59 each located centrally between the adjacent stub shafts 51, distances spaced apart between the positions of the individual shoes 53 and 60 which are in slidable contact with the inner peripheral surface of the drum 42 are equal to one another. Thus, a pressure on the drum 42 caused from slidable contact by the individual shoes 53 and 60 can be distributed to prevent a strain from being produced in the drum 42, while at same time absorbing a difference in pressure acting on the inner peripheral surface of the drum 42 due to an extremely small difference in weight between the individual shoes 53 and 60, to inhibit the generation of vibrations.

Placement of the first and second stub shafts 51 and 59 in the different positions facilitates the operation for securing by rivetting or the like the stub shafts 51 and 59 to the driving plate 41.

Assume that the maintenance of the centrifugal clutch C is conducted. It is considered that the first lining material 56 of the first shoe 53 bearing a relative large amount of transmitted torque is worn relatively early. If the nut 49 is loosened to remove the drum 42 from the output shaft 17, the first shoes 53 can be inspected from the outside and can be easily exchanged into new ones.

In addition, assume that the first and second shoes 53 and 60 as well as first and second clutch springs 58 and 63 are assembled to the output shaft 17 in such a condition that they have been attached to the driving plate 41. In this case, the inner side of the first shoe 53 located outwardly can be manually grasped to fit the driving plate 41 over the output shaft 17, and thus, it is avoided that an oil, or the like carried by the worker's hands stains the lining materials 56 and 62. In the prior art in contrast to this, the shoes are arranged on the driving plate 41 on the side of the driven pulley 19 and hence, in fitting the driving plate over the output shaft, the worker often grasps the lining material by hands, resulting in possibly staining lining material with oil and the like which has been carried by the hands of a worker.

It is noted that grease may fill the elongated hole 35 made in the sliding sleeve 34 and hence, there is a possibility that a very small amount of grease leaks through the sealing member 65 with the sliding movement of the sliding sleeve 34 and is scattered toward the drum 42. However, since the first shoes 53 for permitting a relatively large torque to be transmitted are shielded by the driving plate 41 and the drum 42, the scattered grease is prevented from being stained on the first lining materials 56 of the first shoes 53.

Figure 6:
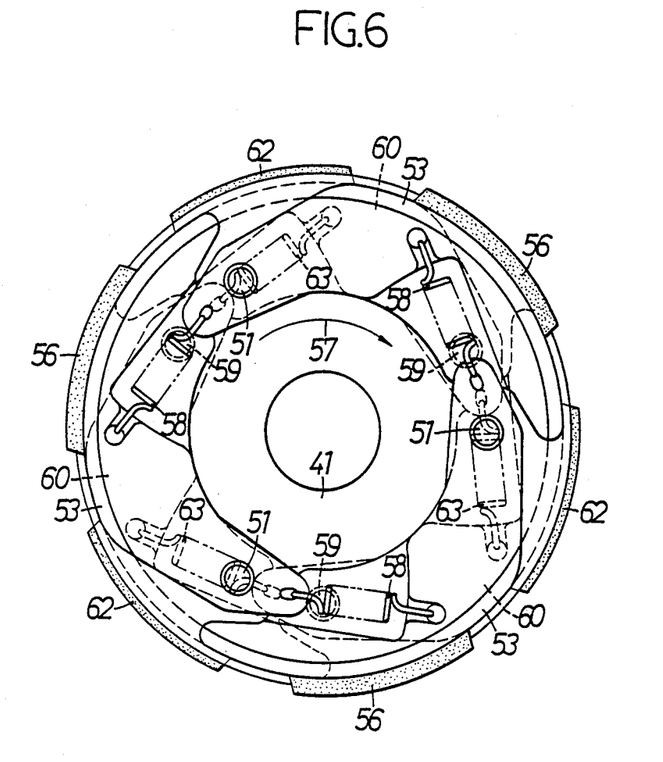
FIG. 6 is a front view of another embodiment according to the p invention corresponding to FIG. 4.

FIG. 6 illustrates another embodiment of the present invention. In the previously described embodiment, the first and second shoes 53 and 60 have been arranged in a leading fashion, respectively, but in this embodiment, the first shoes 53 are arranged in a leading fashion, while the second shoes 60 are arranged in a trailing fashion. More specifically, the second shoes 60 are arranged so that the second lining material 62 is located at the rear of the second stub shaft 5 in the rotational direction 57.

With the present embodiment, it is possible to provide an effect similar to that of the previous embodiment and furthermore to decrease a load applied to the drum 42, which is advantageous in preventing deformation of the drum 42.

Figure 7:
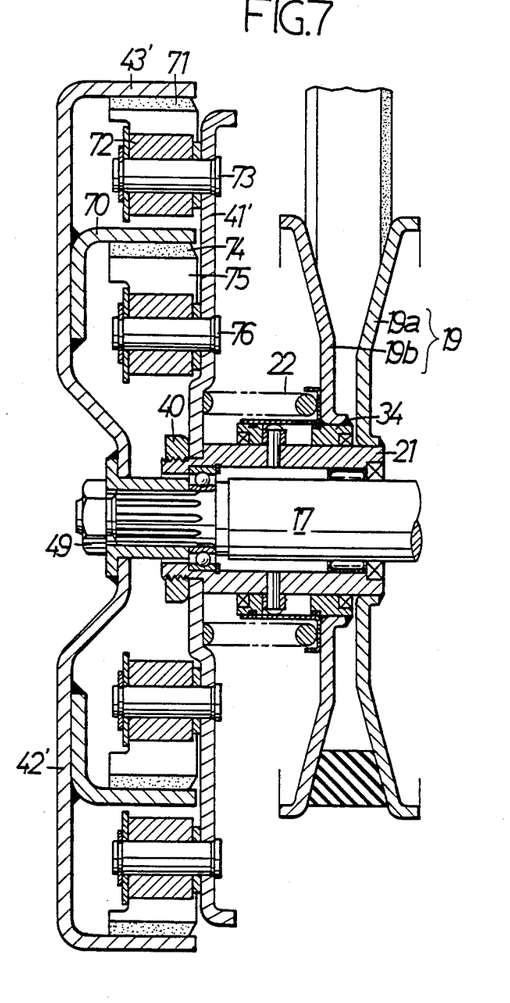
FIG. 7 is an elevational view showing as a reference an arrangement which is considered to increase the clutch capacity.

Now, an arrangement as shown in FIG. 7 has been considered for obtaining increase in the clutch capacity. In this arrangement shown in FIG. 7, a smaller diameter cylindrical portion 70 is secured to a short cylindrical bottomed drum 42' fixed to the output shaft 17 and is concentrically surrounded by a cylindrical portion 43' of the drum 42'. A plurality of shoes 72 each including a lining material 71 capable of slidably contacting with an inner peripheral surface of the cylindrical portion 43' are supported on a driving plate 41', secured to the input shaft 21, by stub shafts 73 parallel to the input shaft 21, and a plurality of shoes 75 each including a lining material 74 capable of slidably contacting with an inner peripheral surface of the smaller diameter cylindrical portion 70 are supported on the driving plate 41' by stub shafts 76 each parallel to the stub shaft 73.

With such arrangement, the number of the shoes 72 and 75 can be increased to increase the clutch capacity, but an increase in diameter of the drum 42' and the driving plate 41' cannot be avoided and thus, the centrifugal clutch according to the present invention is superior to the above conventional clutch with respect to the compactness in size.

What is claimed is:

1. A centrifugal clutch comprising a driving plate having oppositely facing surfaces secured at its central portion to an input shaft operatively connected to a driving source, a cylindrical bottomed drum detachably secured to an end of an output shaft, projecting from said input shaft concentrically and relatively rotatably supported within said input shaft by bearing means, said cylindrical bottomed drum surrounding said driving plate, and a plurality of clutch springs each connected to each of a plurality of shoes which are supported on said plate for movement toward and away from an inner peripheral surface of said drum respectively by a plurality of stub shafts parallel to said input shaft, said clutch spring providing a spring force in a direction away from the inner peripheral surface of said drum, wherein a first group of said shoes having a weight and said clutch springs having a load which are set so as to transmit a relatively large torque between said input shaft and said output shaft are arranged on the driving plate surface facing the closed end of the drum and a second group of said shoes having a weight and said clutch springs having a load which are set so as to transmit a relatively small torque between said input shaft and said output shaft are arranged on the driving plate surface facing the opened end of said drum.

2. The centrifugal clutch according to claim 1, wherein said stub shafts for said first group of shoes and the stub shafts for said second group of shoes are arranged on the driving plate at circumferentially spaced intervals.

3. The centrifugal clutch according to claim 1, wherein each said shoe has a lining material adapted to contact said drum, said lining material being located at a leading position of said shoe with respect to a rotating direction of the driving plate.

4. The centrifugal clutch according to claim 1, wherein each said shoe has a lining material adapted to contact said drum, the lining material of each shoe on one of the opposite sides of the driving plate being located at a leading position of the shoe with respect to a rotating direction of the driving plate while the lining material of each shoe on the other side of the driving plate being located at a trailing position of the shoe with respect to said rotating direction.

5. A centrifugal clutch for operatively connecting an input shaft to an output shaft, comprising:
   a substantially disc-like driving plate having oppositely facing, radially extending surfaces secured to said input shaft,
   a cylindrical drum concentrically surrounding said driving plate and said output shaft and being connected to said output shaft,
   a plurality of first shoes connected to one of said driving plate surface for pivotal centrifugal movement about axes substantially perpendicular to said one surface into engagement with said drum for transmitting torque between said input shaft and said output shaft,
   a plurality of second shoes having a different torque transmitting capacity than said first shoes connected to the other of said driving plate surfaces for pivotal centrifugal movement about axes substantially perpendicular to said other surface into engagement with said drum, said cylindrical drum having a closed bottom end and an open end, said closed bottom end being depressed at a central portion thereof toward said open end and being secured at said depressed central portion to the position on said output shaft which is substantially axially aligned with the shoes located adjacent said bottom end of said drum, and said shoes having the greater torque-transmitting capacity being disposed adjacent said closed drum bottom end.

6. The centrifugal clutch according to claim 5 including clutch springs connected to the respective of said shoes for biasing said shoes in a direction away from said drum.

7. The centrifugal clutch according to claim 6 in which said first shoes are arranged to transmit a greater amount of torque between said input shaft and said output shaft than said second shoes.

8. The centrifugal clutch according to claim 7 in which said first shoes are heavier than said second shoes, and the clutch springs connected to said first shoes are more strongly loaded than those connected to said second shoes.

9. The centrifugal clutch according to claim 8 in which said first shoes being disposed adjacent said drum closed end and said second shoes being disposed adjacent said drum open end.

10. The centrifugal clutch according to claim 9 in which said shoes are connected to said drive plate by circumferentially spaced stub shafts extending from opposite surfaces of said drive plate and whose axes are substantially mutually parallel.

11. The centrifugal clutch according to claim 10 in which said first and second shoes are arranged in the same fashion with respect to the direction of rotation of said drive plate.

12. The centrifugal clutch according to claim 11 in which said fashion is a leading fashion.

13. The centrifugal clutch according to claim 10 in which said first and second shoes are arranged in mutually opposite fashions with respect to the direction of rotation of said drive plate.

14. The centrifugal clutch according to claim 13 in which said first shoes are arranged in leading fashion and said second shoes are arranged in trailing fashion.

15. The centrifugal clutch according to claim 10 in which said stub shafts are disposed at substantially uniform circumferential spacing.

16. The centrifugal clutch according to any one of claims 5 to 15 in which said input shaft and said output shaft are mutually concentrically telescopically disposed.

17. A centrifugal clutch for operatively connecting an input shaft to an output shaft, comprising:

a substantially disc-like driving plate having oppositely facing, radially extending surfaces secured to said input shaft, a cylindrical drum concentrically surrounding said driving plate and being connected to said output shaft, a plurality of first shoes connected to one of said driving plate surfaces for pivotal centrifugal movement into engagement with said drum about axes substantially perpendicular to said one surface for transmitting torque between said input shaft and said output shaft, a plurality of second shoes connected to the other end of said driving plate surfaces for pivotal centrifugal movement about axes substantially perpendicular to said other surface into engagement with said drum, said second shoes being arranged to transmit a lesser amount of torque between said input shaft and said output shaft than said first shoes, clutch springs connected to the respective shoes for biasing said shoes in a direction away from said drum, said first shoes being heavier than said second shoes, and the clutch springs connected to said first shoes being more strongly loaded than those connected to said second shoes.

18. The centrifugal clutch according to claim 17 in which said drum has a closed end and an open end, and said first shoes being disposed adjacent said drum closed end and said second shoes being disposed adjacent said drum open end.

19. The centrifugal clutch according to claim 18 in which said shoes are connected to said drive plate by circumferentially spaced stub shafts extending from opposite surface of said drive plate and whose axes are substantially mutually parallel.

20. The centrifugal clutch according to claim 19 in which said first and second shoes are arranged in the same fashion with respect to the direction of rotation of said drive plate.

21. The centrifugal clutch according to claim 20 in which said fashion is a leading fashion.

22. The centrifugal clutch according to claim 19 in which said first and second shoes are arranged in mutually opposite fashions with respect to the direction of rotation of said drive plate.

23. The centrifugal clutch according to claim 22 in which said first shoes are arranged in leading fashion and said second shoes are arranged in trailing fashion.

24. The centrifugal clutch according to claim 19 in which said stub shafts are disposed at substantially uniform circumferential spacing.

25. The centrifugal clutch according to any one of claims 18 to 24 in which said input shaft and said output shaft are mutually concentrically telescopically disposed.

* * * * *

UNITED STATES PATENT AND TRADEMARK OFFICE
CERTIFICATE OF CORRECTION

PATENT NO. : 4,830,163

DATED : May 16, 1989

INVENTOR(S) : Miyazaki et al.

It is certified that error appears in the above-identified patent and that said Letters Patent is hereby corrected as shown below:

On the title page, amend the designation of assignee to include -- Kabushiki Kaisha F.C.C., Tokyo, Japan --.

Signed and Sealed this

Nineteenth Day of June, 1990

*Attest:*

HARRY F. MANBECK, JR.

*Attesting Officer*      *Commissioner of Patents and Trademarks*